US011136820B2

(12) United States Patent
Schuehmacher et al.

(10) Patent No.: US 11,136,820 B2
(45) Date of Patent: Oct. 5, 2021

(54) MECHANICAL MODULE FOR FILTERING VIBRATIONS, ELECTROMECHANICAL ACTUATOR COMPRISING SUCH A MECHANICAL MODULE FOR FILTERING VIBRATIONS, AND CLOSURE, COVERING OR SOLAR PROTECTION INSTALLATION COMPRISING SUCH AN ELECTRO-MECHANICAL ACTUATOR

(71) Applicant: SOMFY ACTIVITES SA, Cluses (FR)

(72) Inventors: Cyril Schuehmacher, Sallanches (FR); Sébastien Lemaître, Mieussy (FR); Jérôme Pezet, Taninges (FR)

(73) Assignee: SOMFY ACTIVITES SA, Cluses (FR)

( * ) Notice: Subject to any disclaimer, the term of this patent is extended or adjusted under 35 U.S.C. 154(b) by 0 days.

(21) Appl. No.: 17/264,153

(22) PCT Filed: Jul. 31, 2019

(86) PCT No.: PCT/EP2019/070705
§ 371 (c)(1),
(2) Date: Jan. 28, 2021

(87) PCT Pub. No.: WO2020/025711
PCT Pub. Date: Feb. 6, 2020

(65) Prior Publication Data
US 2021/0246724 A1 Aug. 12, 2021

(30) Foreign Application Priority Data

Aug. 1, 2018 (FR) ........................................ 1857201

(51) Int. Cl.
*E06B 9/72* (2006.01)
*F16D 3/12* (2006.01)
(Continued)

(52) U.S. Cl.
CPC ................ *E06B 9/72* (2013.01); *E06B 9/42* (2013.01); *F16D 3/12* (2013.01); *F16F 15/1207* (2013.01); *H02K 7/003* (2013.01); *F16F 2232/02* (2013.01)

(58) Field of Classification Search
CPC ....... E06B 9/72; E06B 9/42; F16D 3/12; F16F 15/1207; F16F 2232/02; H02K 7/003
(Continued)

(56) References Cited

U.S. PATENT DOCUMENTS 5,467,266 A * 11/1995 Jacobs ................... B60J 1/2016
160/1
5,671,387 A 9/1997 Jacobs et al.
(Continued)

FOREIGN PATENT DOCUMENTS

EP 0531079 A1 3/1993
EP 1727959 A1 12/2006
(Continued)

OTHER PUBLICATIONS

International Search Report and Written Opinion dated Oct. 14, 2019 in counterpart application No. PCT/EP2019/070705; w/ English machine translation (total 19 pages).

*Primary Examiner* — Forrest M Phillips
(74) *Attorney, Agent, or Firm* — Seckel IP, PLLC

(57) ABSTRACT

A mechanical module for filtering vibrations, designed to be mounted at least in part inside a casing of an electromechanical actuator, comprises a mechanical member for filtering vibrations (34), being in one piece and extending along a longitudinal axis (X34) designed to be aligned with an axis of rotation of a rotor of an electric motor. The member (34) comprises a first end portion (35) and an intermediate portion (36). The first end portion (35) comprises a first ring (37). The intermediate portion (36) is connected to the first end portion (35). The first ring (37) of
(Continued)

the first end portion (35) has a first diameter that is greater than a greatest dimension of the intermediate portion (36) measured in a plane orthogonal to the longitudinal axis (X34). The first end portion (35) further comprises a plurality of first arms (38), each first arm (38) connecting the intermediate portion (36) to the first ring (37).

20 Claims, 8 Drawing Sheets

(51) Int. Cl.
    *E06B 9/42*     (2006.01)
    *H02K 7/00*     (2006.01)
    *F16F 15/12*    (2006.01)

(58) Field of Classification Search
    USPC .......................................................... 160/310
    See application file for complete search history.

(56) References Cited

U.S. PATENT DOCUMENTS

| | | |
|---|---|---|
| 6,979,962 B2 | 12/2005 | Cavarec et al. |
| 10,770,950 B2* | 9/2020 | Lemaitre ............... H02K 7/06 |
| 2005/0206334 A1* | 9/2005 | Cavarec ............... E06B 9/32 |
| | | 318/139 |
| 2020/0099271 A1 | 3/2020 | Lemaitre et al. |

FOREIGN PATENT DOCUMENTS

| | | |
|---|---|---|
| WO | 2005090736 A1 | 9/2005 |
| WO | 2018104488 A1 | 6/2018 |

\* cited by examiner

MECHANICAL MODULE FOR FILTERING VIBRATIONS, ELECTROMECHANICAL ACTUATOR COMPRISING SUCH A MECHANICAL MODULE FOR FILTERING VIBRATIONS, AND CLOSURE, COVERING OR SOLAR PROTECTION INSTALLATION COMPRISING SUCH AN ELECTRO-MECHANICAL ACTUATOR The present invention relates to a mechanical module for filtering vibrations, intended to be mounted at least partially inside a casing of an electromechanical actuator for a closure, covering or solar protection installation.

The present invention also relates to an electromechanical actuator comprising such a mechanical module for filtering vibrations, and a closure, covering or solar protection installation comprising a screen that can be wound on a winding tube driven in rotation by such an electromechanical actuator.

In general terms, the present invention relates to the field of covering devices comprising a motorized drive device that puts a screen into movement, between at least a first position and at least a second position.

A motorized drive device comprises an electromechanical actuator for a movable closure, covering or solar protection element such as a shutter, a door, a gate, a blind, or any other equivalent piece of equipment, referred to hereafter as a screen.

The electromechanical actuator is intended to be mounted inside the winding tube. Moreover, the electromechanical actuator comprises at least an electric motor and, preferably, a reducer. When the electromechanical actuator is put into operation, the electric motor and the reducer generate vibrations, that may be transmitted to the elements surrounding the electric motor, notably the casing of the electromechanical actuator and the winding tube.

Consequently, when the electromechanical actuator is put into operation and in an assembled configuration of the electromechanical actuator in the installation, the electromechanical actuator generates noise.

There is a known document, WO 2018/104488 A1, that describes a mechanical module for filtering vibrations intended to be mounted inside a casing of an electromechanical actuator for a closure, covering or solar protection installation. The mechanical module for filtering vibrations comprises a mechanical vibration filtering member. The mechanical vibration filtering member is made in one piece and extends along a longitudinal axis intended to be aligned with an axis of rotation of a rotor of an electric motor. The mechanical vibration filtering member comprises a first end portion and an intermediate portion. The first end portion comprises a first ring. The intermediate portion is connected to the first end portion. The first ring of the first end portion has a first diameter greater than a greatest dimension of the intermediate portion measured in a plane orthogonal to the longitudinal axis.

However, this mechanical module for filtering vibrations has the drawback of making the manufacture of the mechanical vibration filtering member difficult. This difficulty increases as the inside diameter of the casing of the electromechanical actuator decreases.

Consequently, the dimensions of the mechanical vibration filtering member, the thickness of the connections of the intermediate portion and the complexity of the connections of the intermediate portion of this member lead to a complexity of industrial production, that is manifested in high cost and risks in terms of quality.

Furthermore, the industrial production of the mechanical vibration filtering member presents difficulties in the injection of its constituent plastic material and notably a deformation of this material along its length.

Moreover, such a structure of the mechanical vibration filtering member has a significant length.

Consequently, the mechanical vibration filtering member occupies a considerable amount of space inside the casing of the electromechanical actuator, resulting in a significant length of the electromechanical actuator.

Furthermore, the mechanical vibration filtering member is configured to be fastened, on the one hand, to the casing of the electromechanical actuator and, on the other hand, to the electric motor.

The object of the present invention is to resolve the aforesaid disadvantages and to propose a mechanical module for filtering vibrations intended to be mounted at least partially inside a casing of an electromechanical actuator for a closure, covering or solar protection installation, as well as an electromechanical actuator comprising such a mechanical module for filtering vibrations and a closure, covering or solar protection installation comprising such an electromechanical actuator, making it possible to simplify a structure of a mechanical vibration filtering member and to ensure a reduction in vibrations transmission from the electromechanical actuator to the installation, while minimizing the costs of producing the mechanical module for filtering vibrations and thus the cost of the electromechanical actuator.

In this context, the present invention proposes, according to a first aspect, a mechanical module for filtering vibrations intended to be mounted at least partially inside a casing of an electromechanical actuator for a closure, covering or solar protection installation, the mechanical module for filtering vibrations comprising at least a mechanical vibration filtering member, the mechanical vibration filtering member being made in one piece and extending along a longitudinal axis intended to be aligned with an axis of rotation of a rotor of an electric motor, the mechanical vibration filtering member comprising at least:

a first end portion, the first end portion comprising at least a first ring, and an intermediate portion, the intermediate portion being connected to the first end portion, the first ring of the first end portion having a first diameter greater than a greatest dimension of the intermediate portion measured in a plane orthogonal to the longitudinal axis.

According to the invention, the first end portion further comprises a plurality of first arms, each first arm connecting the intermediate portion to the first ring.

Thus, such a structure of the mechanical vibration filtering member is simplified and makes it possible to ensure a reduction in vibrations transmission from the electromechanical actuator to the installation, while minimizing the costs of producing the mechanical module for filtering vibrations and of the electromechanical actuator.

In this way, the industrial production of such a mechanical module for filtering vibrations is facilitated.

The structure of the mechanical vibration filtering member makes it possible to produce a deformation of the intermediate portion, as well as to produce a swivel at the joint between the intermediate portion and the first end portion.

The structure of the mechanical vibration filtering member also makes it possible to minimize the length of the latter and thus to produce a compact mechanical module for filtering vibrations, so as to minimize the length of the electromechanical actuator.

Moreover, the first arms of the first end portion make it possible to provide a high torsional stiffness and a low bending stiffness of the mechanical vibration filtering member.

Furthermore, such a mechanical module for filtering vibrations is also particularly suitable for electromechanical actuators comprising a casing having a small diameter.

In an embodiment, the intermediate portion has a cross section of circular shape, in the plane orthogonal to the longitudinal axis.

In another embodiment, the intermediate portion has a cross section of rectangular shape, in the plane orthogonal to the longitudinal axis.

According to an advantageous characteristic of the invention, the mechanical vibration filtering member further comprises at least a second end portion, the second end portion being opposed to the first end portion, along the longitudinal axis. The second end portion comprises at least a second ring. The intermediate portion is connected to the second end portion and is positioned between the first and second end portions. The second ring of the second end portion has a second diameter greater than the greatest dimension of the intermediate portion measured in the plane orthogonal to the longitudinal axis.

According to another advantageous characteristic of the invention, the second diameter of the second ring is smaller than the first diameter of the first ring, or vice versa.

According to another advantageous characteristic of the invention, the second end portion further comprises a plurality of second arms, each second arm connecting the intermediate portion to the second ring.

According to another advantageous characteristic of the invention, the first arms are angularly offset with respect to the second arms, around the longitudinal axis, by a predetermined angular value.

The present invention proposes, according to a second aspect, an electromechanical actuator for a closure, covering or solar protection installation, the electromechanical actuator comprising at least:
 an electric motor,
 a casing, the electric motor being mounted inside the casing, in an assembled configuration of the electromechanical actuator, and
 a mechanical module for filtering vibrations, according to the invention and as mentioned above.

This electromechanical actuator has similar characteristics and advantages to those described above, in relation to the mechanical module for filtering vibrations according to the invention.

According to another advantageous characteristic of the invention, in the assembled configuration of the electromechanical actuator, the first end portion of the mechanical vibration filtering member is fastened to the casing by means of first fastening elements.

According to another advantageous characteristic of the invention, the electromechanical actuator further comprises a torque support, the torque support being positioned at a first end of the casing of the electromechanical actuator, in the assembled configuration of the electromechanical actuator.

According to another advantageous characteristic of the invention, the second end portion of the mechanical vibration filtering member is fastened to the torque support by means of second fastening elements.

According to another advantageous characteristic of the invention, the electromechanical actuator comprises a bushing. The bushing is also mounted around a shaft of the torque support.

According to another advantageous characteristic of the invention, in the assembled configuration of the electromechanical actuator, the electromechanical actuator further comprises at least a viscoelastic element positioned between the second end portion of the mechanical vibration filtering member and the bushing.

According to another advantageous characteristic of the invention, in the assembled configuration of the electromechanical actuator, the electromechanical actuator further comprises at least a viscoelastic element positioned between the casing of the electromechanical actuator and the bushing.

According to another advantageous characteristic of the invention, in the assembled configuration of the electromechanical actuator, the electromechanical actuator further comprises at least a viscoelastic element positioned between the torque support and the bushing.

In a variant, the second end portion of the mechanical vibration filtering member forms the torque support.

According to another advantageous characteristic of the invention, the electromechanical actuator comprises at least a battery, the battery being positioned inside the casing.

According to another advantageous characteristic of the invention, the first end portion comprises at least a first gap between the first ring and one of the first arms for the passage of at least a cable.

The present invention proposes, according to a third aspect, a closure, covering or solar protection installation comprising a screen, a winding tube and an electromechanical actuator, according to the invention and as mentioned above, the screen being windable onto the winding tube and the winding tube being driven in rotation by the electromechanical actuator.

This installation has similar characteristics and advantages to those described above in relation to the electromechanical actuator according to the invention.

Other characteristics and advantages of the invention will be apparent from the following description, given with reference to the attached drawings, provided by way of non-limiting examples:

FIG. 1 is a schematic cross-sectional view of an installation according to a first embodiment of the invention;
 FIG. 2 is a schematic perspective view of the installation shown in FIG. 1;
 FIG. 3 is a schematic sectional view of an electromechanical actuator of the installation shown in FIGS. 1 and 2, according to the first embodiment;
 FIG. 4 is a schematic sectional view of a part of the electromechanical actuator shown in FIG. 3, showing a mechanical module for filtering vibrations according to the first embodiment;
 FIG. 5 is a schematic perspective and exploded view of the part of the electromechanical actuator shown in FIG. 4;
 FIG. 6 is a schematic perspective view of a mechanical vibration filtering member of the mechanical module for filtering vibrations shown in FIGS. 4 and 5;
 FIG. 7 is a schematic sectional view of the mechanical vibration filtering member shown in FIG. 6;
 FIG. 8 is a schematic side view of the mechanical vibration filtering member shown in FIGS. 6 and 7;
 FIG. 9 is a schematic perspective view of a torque support of the electromechanical actuator shown in FIGS. 4 and 5;
 FIG. 10 is a schematic perspective view of a bushing of the electromechanical actuator shown in FIGS. 4 and 5;

Figure 1:
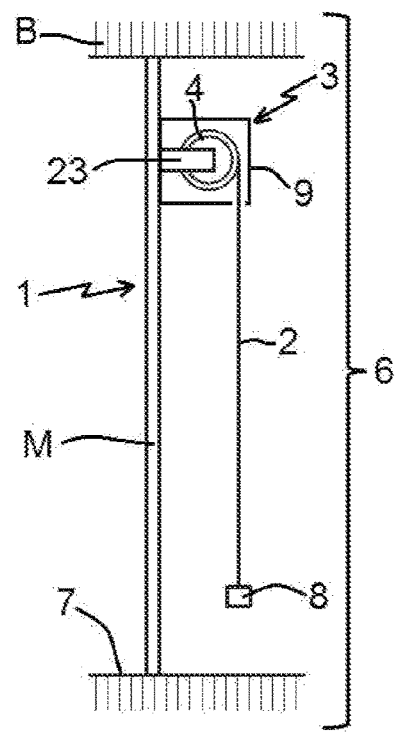
Figure 2:
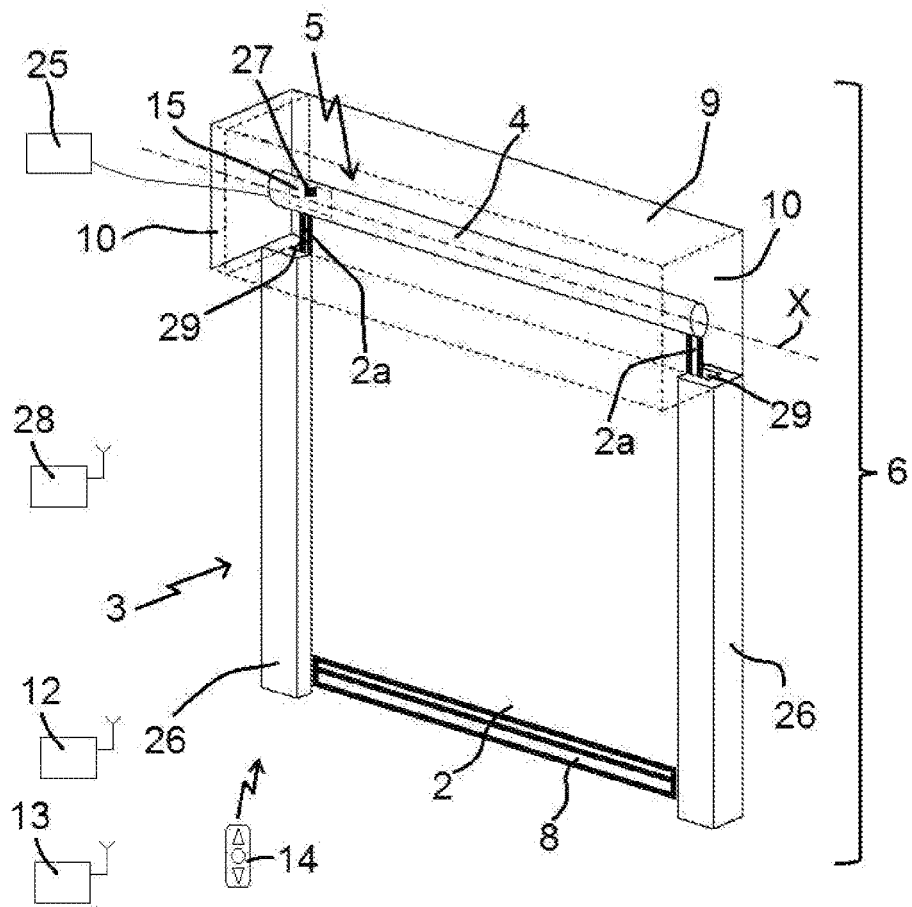

Firstly, a description is given, with reference to FIGS. 1 and 2, of an installation 6 according to the invention and installed in a building B having an opening 1, which may be a window or a door, equipped with a screen 2 belonging to a closure, covering or solar protection device 3, in particular a motorized blind.

The closure, covering or solar protection device 3 is referred to subsequently as a "covering device". The covering device 3 comprises the screen 2.

The covering device 3 may comprise a blind, notably a windable cloth, a pleated blind or a louver blind. The covering device 3 may also comprise a roller shutter or a roller door. The present invention is applicable to all types of covering device.

A roller blind according to an embodiment of the invention is now described with reference to FIGS. 1 and 2.

The covering device 3 comprises a winding tube 4 and a motorized drive device 5. The motorized drive device 5 comprises an electromechanical actuator 11.

The screen 2 of the covering device 3 is wound onto the winding tube 4 driven by the motorized drive device 5. Thus, the screen can be moved between a wound position, in particular a high position, and an unwound position, in particular a low position.

The screen 2 of the covering device 3 is a closure, covering and/or solar protection device that is wound or unwound around the winding tube 4, the inside diameter of which is substantially greater than the outside diameter of the electromechanical actuator 11, so that the electromechanical actuator 11 can be inserted into the winding tube 4, during the assembly of the covering device 3.

Advantageously, the covering device 3 comprises a holding device 9, 23.

Advantageously, the holding device 9, 23 may comprise two supports 23. One support 23 is positioned at each end of the winding tube 4, in an assembled configuration of the covering device 3.

Thus, the winding tube 4 is held by means of the supports 23. Only one of the supports 23 is shown in FIG. 1. The supports 23 enable the covering device 3 to be joined mechanically to the structure of the building B, notably to a wall M of the building B.

Advantageously, the holding device 9, 23 may comprise a box 9. Moreover, the winding tube 4 and at least a part of the screen 2 are housed inside the box 9, in the assembled configuration of the covering device 3.

In general terms, the box 9 is positioned above the opening 1, or in the upper part of the opening 1.

Here and as shown in FIG. 1, the supports 23 are also housed inside the box 9.

In a variant, shown in FIG. 2, the winding tube 4 is held by means of the box 9, in particular by means of side pieces 10 of the box 9.

Advantageously, the covering device 3 may also comprise two lateral slides 26, as shown in FIG. 2. Each lateral slide 26 comprises a channel 29. Each channel 29 of one of the lateral slides 26 interacts, or in other words is configured to interact, with a lateral edge 2a of the screen 2, in the assembled configuration of the covering device 3, so as to guide the screen 2, during the winding and the unwinding of the screen 2 around the winding tube 4.

The electromechanical actuator 11 is, for example, of the tubular type. This enables the winding tube 4 to be put into rotation around an axis of rotation X, so as to unwind or wind the screen 2 of the covering device 3.

Thus, the screen 2 may be wound and unwound on the winding tube 4. In the mounted state, the electromechanical actuator 11 is inserted into the winding tube 4.

Advantageously, the covering device 3 also comprises a load bar 8 to exert tension on the screen 2.

The roller blind, which forms the covering device 3, comprises a cloth, forming the screen 2 of the windable blind 3. A first end of the screen 2, in particular the upper end of the screen 2, in the assembled configuration of the covering device 3, is fastened to the winding tube 4. Moreover, a second end of the screen 2, in particular the lower end of the screen 2, in the assembled configuration of the covering device 3, is fastened to the load bar 8.

Here, the cloth forming the screen 2 is made from a textile material.

In an example of embodiment, not shown, the first end of the screen 2 has a hem through which a rod, in particular of plastic material, is placed. This hem, formed at the first end of the screen 2, is produced by stitching the cloth forming the screen 2. When the screen 2 is assembled onto the winding tube 4, the hem and the rod located at the first end of the screen 2 are inserted by sliding into a groove formed on the outer face of the winding tube 4, in particular along the whole length of the winding tube 4, so as to fix the screen 2 to the winding tube 4 and enable the screen 2 to be wound and unwound around the winding tube 4.

In the case of a roller blind, the high wound position corresponds to a predetermined high end-limit position, or to the bearing of the load bar 8 of the screen 2 against an edge of the box 9 of the windable blind 3, and the low unwound position corresponds to a predetermined low end-limit position, or to the bearing of the load bar 8 of the screen 2 against a threshold 7 of the opening 1, or to the complete unwinding of the screen 2.

Advantageously, the motorized drive device 5 is controlled by a command unit. The command unit may be, for example, a local command unit 12 or a central command unit 13.

Advantageously, the local command unit 12 may be connected by a wire or wireless link to the central command unit 13.

Advantageously, the central command unit 13 may control the local command unit 12, as well as other local command units similar and distributed within the building.

Advantageously, the central command unit 13 may be in communication with a weather station positioned within the building B or located remotely outside the building B, including, notably, one or more sensors that can be configured to determine, for example, temperature, brightness, or wind speed, in the case where the weather station is located remotely outside the building B.

A remote control 14, which may be a type of local command unit, and provided with a control keyboard, comprising selection and display elements, also enables a user to operate the electromechanical actuator 11 and/or the central command unit 13.

The motorized drive device 5 is, preferably, configured to execute commands for winding or unwinding the screen 2 of the covering device 3, that may be sent, notably, by the local command unit 12, the central command unit 13 or the remote control 14.

Figure 3:
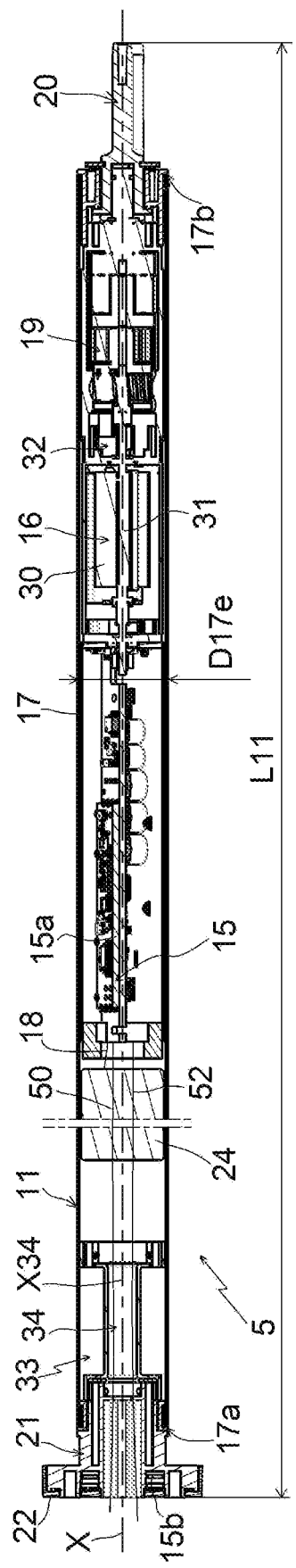
Figure 4:
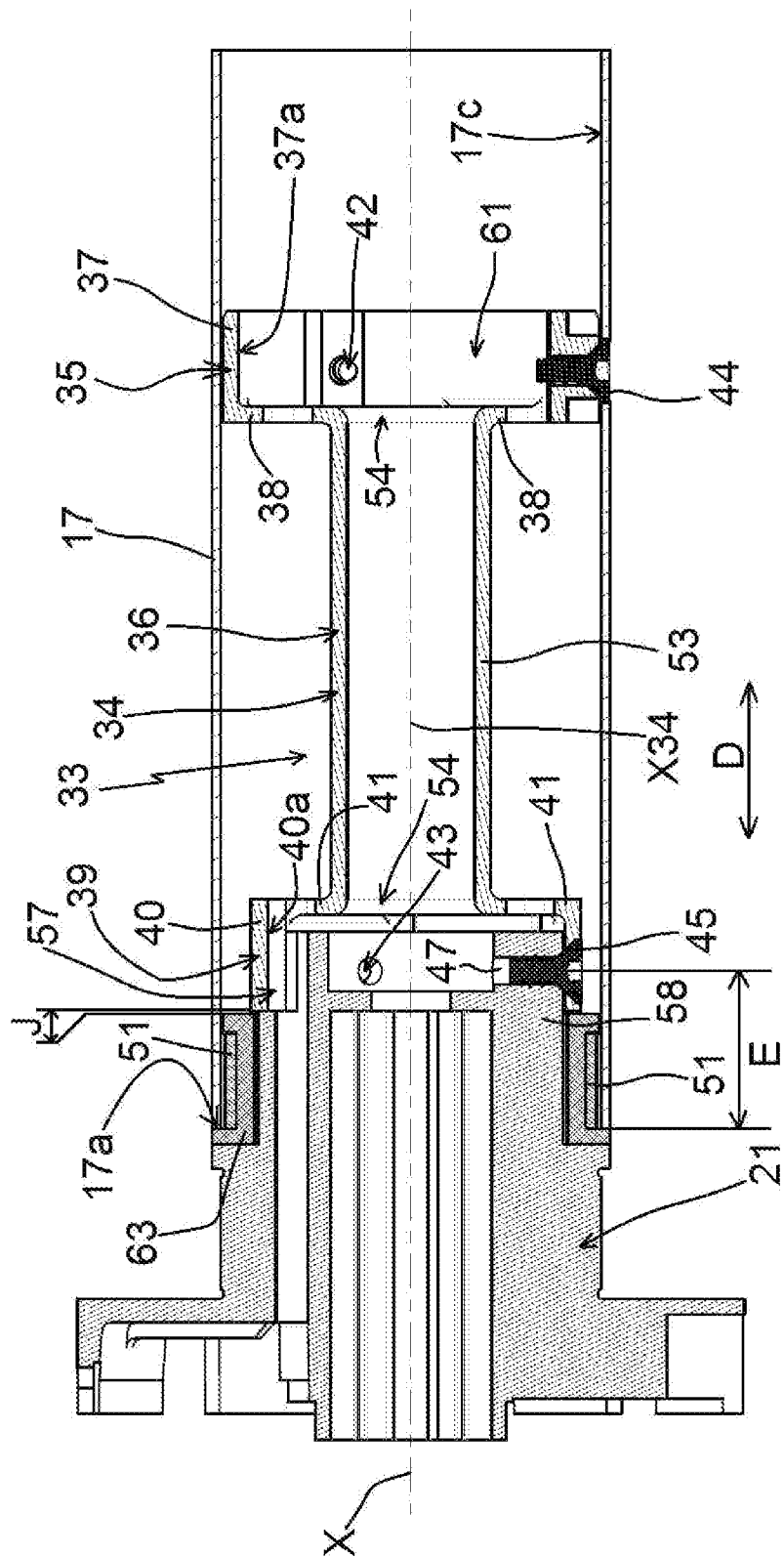

The electromechanical actuator 11 belonging to the installation 6 of FIGS. 1 and 2 is now described in greater detail and with reference to FIG. 3.

The electromechanical actuator 11 comprises an electric motor 16. The electric motor 16 comprises a rotor 31 and a stator 30, positioned coaxially around the axis of rotation X, which is also the axis of rotation of the winding tube 4 in the mounted configuration of the motorized drive device 5.

Control means of the electromechanical actuator 11, enabling the screen 2 of the covering device 3 to be moved, comprise at least an electronic control unit 15. This electronic control unit 15 is capable of putting the electric motor 16 of the electromechanical actuator 11 into operation and, in particular, of enabling electrical energy to be supplied to the electric motor 16.

Thus, the electronic control unit 15 commands, notably, the electric motor 16, so as to open or close the screen 2, as described above.

Advantageously, the electronic control unit 15 also comprises a communication module 27, as shown in FIG. 2, in particular for receiving control commands, the control commands being sent by a command emitter, such as the remote control 14 intended to command the electromechanical actuator 11 or one of the local 12 or central 13 command units.

Preferably, the communication module 27 of the electronic control unit 15 is of the wireless type. In particular, the communication module 27 is configured to receive radio control commands.

The communication module 27 may also permit the reception of control commands transmitted by wire means.

The central control unit 13, the local control unit 12 or the electronic control unit 15 may also communicate with a server 28, as shown in FIG. 2, so as to control the electromechanical actuator 11 according to data made available remotely by means of a communication network, in particular an internet that can be connected to the server 28.

The control means of the electromechanical actuator 11 comprise hardware and/or software means.

By way of non-limiting example, the hardware means may comprise at least a microcontroller.

Advantageously, the electromechanical actuator 11 is supplied with electrical energy by means of at least a battery 24.

Here, the electromechanical actuator 11 comprises a power supply cable 18 for supplying it with electrical energy, in particular from the battery 24.

Advantageously, the battery 24 is of the rechargeable type and supplies electrical energy to the electromechanical actuator 11.

Advantageously, the battery 24 is positioned inside the casing 17 of the electromechanical actuator 11.

Advantageously, the battery 24 comprises one or more energy storage elements, not shown. The energy storage elements of the battery 24 may be, notably, rechargeable accumulators or rechargeable cells.

Advantageously, the motorized drive device 5 and, in particular, the electronic control unit 15 comprises charging elements configured to charge the battery 24 using the electrical energy supplied by an external electrical energy supply source 25, as shown in FIG. 2.

By way of non-limiting example, the external electrical energy supply source 25 is a charger that can be plugged into an electrical wall socket, so as to recharge the battery 24 from a mains electricity supply network.

In a variant, not shown, the external electrical energy supply source 25 is an auxiliary battery, so as to recharge the battery 24.

Thus, the battery 24 may be recharged by means of the auxiliary battery forming the external electrical energy supply source 25, in particular in the case where the covering device 3 is remote from an electrical wall socket.

Advantageously, the electronic control unit 15 comprises a first electronic circuit card 15a and a second electronic circuit card 15b.

Advantageously, the first electronic circuit card 15a is configured to control the electric motor 16. Moreover, the second electronic circuit card 15b is configured for, notably, enabling the battery 24 to be recharged, by means of an electrical connector that, not shown, and, eventually, providing access to functions of parameterizing and/or configuring the electromechanical actuator 11, by means of selection elements and, eventually, display elements, not shown.

Here and in a non-limiting manner, the charging elements are positioned at the second electronic circuit card 15b.

In a variant, not shown, the electromechanical actuator 11 is supplied with electrical energy by a mains electricity supply network.

The electromechanical actuator 11 comprises a casing 17, in particular tubular.

Here, the casing 17 of the electromechanical actuator 11 is of cylindrical shape, notably of revolution.

In an example of embodiment, the casing 17 is made of a metallic material.

The material of the casing of the electromechanical actuator is not limiting and may be different. In particular, it may be a plastic material.

Advantageously, the electromechanical actuator 11 also comprises a reducer 19 and an output shaft 20.

Advantageously, the reducer 19 comprises at least a reduction stage. The reduction stage may be a gear train of the epicyclic type.

The type and the number of reduction stages of the reducer are not limiting.

Advantageously, the electromechanical actuator 11 also comprises a brake 32.

By way of non-limiting examples, the brake 32 may be a spring brake, a cam brake or an electromagnetic brake.

Advantageously, the electric motor 16, the reducer 19 and, eventually, the brake 32 are positioned inside the casing 17 of the electromechanical actuator 11.

Advantageously, the electromechanical actuator 11 may also comprise a limit and/or obstacle detection device, which may be mechanical or electronic.

The winding tube 4 is driven in rotation around the axis of rotation X and the casing 17 of the electromechanical actuator 11 while being supported by means of two pivot links. The first pivot link is formed at a first end of the winding tube 4 by means of a ring, not shown, inserted around a first end 17a of the casing 17 of the electromechanical actuator 11. Thus, the ring enables a bearing to be formed. The second pivot link, not shown, is formed at a second end of the winding tube 4.

Advantageously, the electromechanical actuator 11 comprises a torque support 21, which may also be called an actuator head 21. The torque support 21 is positioned at the first end 17a of the casing 17 of the electromechanical actuator 11, in an assembled configuration of the electromechanical actuator 11. The torque support 21 makes it possible to take up the forces exerted by the electromechanical actuator 11 and to ensure that the forces exerted by the electromechanical actuator 11, in particular the torque exerted by the electromechanical actuator 11, are taken up by the structure of the building B. Advantageously, the torque support 21 also makes it possible to take up the forces exerted by the winding tube 4, notably the weight of the winding tube 4, the electromechanical actuator 11 and the screen 2, and to ensure that these forces are taken up by the structure of the building B.

Thus, the torque support 21 of the electromechanical actuator 11 enables the electromechanical actuator 11 to be fastened to the holding device 9, 23, in particular to one of the supports 23 or to one of the side pieces 10 of the box 9.

Advantageously, the torque support 21 projects at the first end 17a of the casing 17 of the electromechanical actuator 11, in particular the end 17a of the casing 17 receiving the ring. The ring consists of, or in other words is configured to form, a bearing for guiding the winding tube 4 in rotation, in the assembled configuration of the covering device 3.

Advantageously, the torque support 21 of the electromechanical actuator 11 can also enable the first end 17a of the casing 17 to be closed.

Furthermore, the torque support 21 of the electromechanical actuator 11 may also enable at least a part of the electronic control unit 15 to be supported.

Advantageously, the electronic control unit 15 may be supplied with electrical energy by means of the power supply cable 18.

Advantageously, the electronic control unit 15 may be positioned at least partially inside the casing 17 of the electromechanical actuator 11.

Furthermore, the electronic control unit 15 may be positioned at least partially outside the casing 17 of the electromechanical actuator 11 and, in particular, may be mounted on one of the two supports 23, on one of the side pieces 10 of the box 9 or in the torque support 21.

Here, the first electronic circuit card 15a of the electronic control unit 15 is positioned inside the casing 17 of the electromechanical actuator 11. Moreover, the second electronic circuit card 15b is positioned inside the torque support 21 of the electromechanical actuator 11.

Here and as shown in FIG. 3, the torque support 21 comprises a cover 22. Moreover, the second electronic circuit card 15b is positioned inside a housing formed between the torque support 21 and the cover 22.

Advantageously, the torque support 21 comprises at least a button, not shown.

This button or these buttons may possibly be used to carry out an adjustment of the electromechanical actuator 11 using one or more configuration modes, to pair one or more command units 12, 13, 14, to reset one or more parameters, possibly including, for example, an end-limit stop position, to reset the paired command units 12, 13, 14 or to command the movement of the screen 2.

Here, the torque support 21 comprises a single button.

The number of buttons on the torque support is not limiting and may be different. Notably, it may be two or more.

Advantageously, the torque support 21 comprises at least a lighting device, not shown, so as to provide visual information, such as, for example, a state of charge of the battery 24.

Advantageously, the lighting device comprises at least a light source, not shown, in particular a light-emitting diode, mounted on the second electronic circuit card 15b and, eventually, a transparent or translucent cap and/or a light guide, to allow the passage of the light emitted by the light source.

Here, the torque support 21 comprises a single lighting device.

The number of lighting devices is not limiting and may be different. Notably, it may be two or more.

Advantageously, the output shaft 20 of the electromechanical actuator 11 is positioned inside the winding tube 4 and at least partially outside the casing 17 of the electromechanical actuator 11.

Here, an end of the output shaft 20 projects from the casing 17 of the electromechanical actuator 11, in particular from a second end 17b of the casing 17 opposite the first end 17a.

Advantageously, the output shaft 20 of the electromechanical actuator 11 is configured to drive in rotation a linking element, not shown, connected to the winding tube 4. The linking element is made in the form of a wheel.

When the electromechanical actuator 11 is put into operation, the electric motor 16 and the reducer 19 drive the output shaft 20 in rotation. Moreover, the output shaft 20 of the electromechanical actuator 11 drives the winding tube 4 in rotation by means of the linking element.

Thus, the winding tube 4 drives the screen 2 of the covering device 3 in rotation, so as to open or close the opening 1.

The electromechanical actuator 11 comprises a mechanical module for filtering vibrations 33. Moreover, the mechanical module for filtering vibrations 33 is mounted at least partially inside the casing 17 of the electromechanical actuator 11.

The mechanical module for filtering vibrations 33 of the electromechanical actuator 11, shown in FIG. 3, according to the first embodiment of the invention, is now described with reference to FIGS. 4 to 10.

The mechanical module for filtering vibrations 33 comprises at least a mechanical vibration filtering member 34. The mechanical vibration filtering member 34 is made in one piece and extends along a longitudinal axis X34 intended to be aligned with the axis of rotation X of the rotor 31 of the electric motor 16.

The mechanical vibration filtering member 34 comprises a first end portion 35 and an intermediate portion 36. The first end portion 35 comprises a first ring 37. Moreover, the intermediate portion 36 is connected to the first end portion 35. The first ring 37 of the first end portion 35 has a first diameter D37 greater than a greatest dimension H36 of the intermediate portion 36 measured in a plane P orthogonal to the longitudinal axis X34.

The first end portion 35 further comprises a plurality of first arms 38. Each first arm 38 connects the intermediate portion 36 to the first ring 37.

Thus, such a structure of the mechanical vibration filtering member 34 is simplified, in particular by comparison with the prior art known from the document WO 2018/104488 A1, and makes it possible to ensure a reduction in vibrations transmission from the electromechanical actuator 11 to the installation 6, while minimizing the costs of producing the mechanical module for filtering vibrations 33 and thus of the electromechanical actuator 11.

Thus, the industrial production of such a mechanical module for filtering vibrations 33 is facilitated.

The structure of the mechanical vibration filtering member 34 makes it possible to produce a deformation of the intermediate portion 36, as well as to produce a swivel at the joint between the intermediate portion 36 and the first end portion 35.

The structure of the mechanical vibration filtering member 34 also makes it possible to minimize the length L34 of the latter and thus to produce a compact mechanical module for filtering vibrations 34, so as to minimize the length L11 of the electromechanical actuator 11.

Advantageously, the length L34 of the mechanical vibration filtering member 34 is determined so as to optimize the vibration absorption.

Moreover, the first arms 38 of the first end portion 35 make it possible to provide the mechanical vibration filtering member 34 with a high torsional stiffness around the axis of rotation X and a low bending stiffness.

Furthermore, such a mechanical module for filtering vibrations 33 is particularly suitable for electromechanical actuators comprising a casing having a small diameter D17e, in particular the outside diameter, which may be, for example, about 20 to 60 millimeters and, preferably, about 25 to 30 millimeters.

The greatest dimension H36 of the intermediate portion 36 measured in the plane P orthogonal to the longitudinal axis X34 is a height.

Here, the mechanical module for filtering vibrations 33 comprises a single mechanical vibration filtering member 34.

The use of a single mechanical vibration filtering member 34 is due to the weight of the electromechanical actuator 11 and, in particular, to the incorporation of the battery 24 inside the casing 17.

In this first embodiment, the intermediate portion 36 has a cross section of circular shape, in the plane P orthogonal to the longitudinal axis X34.

Thus, the height H36 of the intermediate portion 36, in the plane P orthogonal to the longitudinal axis X34, is equal to a diameter D36 of the intermediate portion 36.

Advantageously, the mechanical vibration filtering member 34 further comprises at least a second end portion 39. The second end portion 39 is opposed to the first end portion 35, along the longitudinal axis X34. The second end portion 39 comprises a second ring 40. The intermediate portion 36 is connected to the second end portion 39 and positioned between the first and second end portions 35, 39. The second ring 40 of the second end portion 39 has a second diameter D40 greater than the greatest dimension H36 of the intermediate portion 36 measured in the plane P orthogonal to the longitudinal axis X34. Moreover, the second end portion 39 further comprises a plurality of second arms 41. Each second arm 41 connects the intermediate portion 36 to the second ring 40.

Thus, the structure of the mechanical vibration filtering member 34 makes it possible to produce a swivel at the joint between the intermediate portion 36 and the second end portion 39.

Moreover, the second arms 41 of the second end portion 39 make it possible to provide the mechanical vibration filtering member 34 with a high torsional stiffness and a low bending stiffness.

Here, the intermediate portion 36 may also be called central shaft. The first end portion 35 may also be called the first end plate. The second end portion 39 may also be called the second end plate. The first ring 37 of the first end portion 35 may also be called the first rim. Moreover, the second ring 40 of the second end portion 39 may also be called the second rim.

Advantageously, the mechanical vibration filtering member 34 is made of a plastic material. This material may be, for example, a polyacetal, notably a polyoxymethylene, abbreviated to POM.

This mechanical vibration filtering member 34 is easier to injection mold than that described in the document WO 2018/104488 A1.

Here, the first end portion 35 comprises three first arms 38. Moreover, the second end portion 39 comprises three second arms 41.

The number of first arms and the number of second arms are not limiting and may be different. Each number of first and second arms may be more than or equal to two and, notably, may be equal to six.

In the first embodiment, the second diameter D40 of the second ring 40 is smaller than the first diameter D37 of the first ring 37.

In the first embodiment, the mechanical vibration filtering member 34 is mounted integrally inside the casing 17 of the electromechanical actuator 11.

Advantageously, the first end portion 35 of the mechanical vibration filtering member 34 further comprises a first cavity 61.

Advantageously, the first end portion 35 of the mechanical vibration filtering member 34 comprises at least a first relief element 62 extending from an inner surface 37a of the first ring 37 toward the longitudinal axis X34, or in other words extending inside the first cavity 61 of the first end portion 35.

Here, the first end portion 35 of the mechanical vibration filtering member 34 comprises three first relief elements 62 positioned at an angle of 120° to each other, around the axis of rotation X and the longitudinal axis X34.

The number and angular position of the first relief elements are not limiting and may be different. There may be one or more first relief elements, for example two positioned at an angle of 180° to each other, around the axis of rotation and the longitudinal axis.

Advantageously, the second end portion 39 of the mechanical vibration filtering member 34 comprises a second cavity 57. Moreover, the second cavity 57 of the second end portion 39 interacts, or in other words is configured to interact, with the torque support 21 and, more particularly, a shaft 58 of the torque support 21, in the assembled configuration of the electromechanical actuator 11.

Thus, the shaft 58 of the torque support 21 is housed inside the second cavity 57 of the second end portion 39 of the mechanical vibration filtering member 34, in the assembled configuration of the electromechanical actuator 11.

In this way, the second end portion 39 of the mechanical vibration filtering member 34 is held on the torque support 21 by interlocking, in the assembled configuration of the electromechanical actuator 11.

Advantageously, the second end portion 39 of the mechanical vibration filtering member 34 comprises at least a second relief element 59 extending from an inner surface 40a of the second ring 40 toward the longitudinal axis X34, or in other words extending inside the second cavity 57 of the second end portion 39. The shaft 58 of the torque support 21 comprises at least a recessed element 60. Moreover, the or other of the second relief elements 59 of the second end portion 39 of the mechanical vibration filtering member 34 interacts, or in other words is configured to interact, with the or other of the recessed elements 60 of the shaft 58 of the torque support 21, in the assembled configuration of the electromechanical actuator 11.

The second relief element or elements 59 of the second end portion 39 may also be called ribs or teeth.

The recessed element or elements 60 of the shaft 58 of the torque support 21 may also be called grooves or housings.

Here, the second end portion 39 of the mechanical vibration filtering member 34 comprises three second relief elements 59 positioned at an angle of 120° to each other, around the axis of rotation X and the longitudinal axis X34. Moreover, the shaft 58 of the torque support 21 comprises three recessed elements 60 positioned at an angle of 120° to each other, around the axis of rotation X.

The number and the angular position of the relief elements and the recessed elements are not limiting and may be different. There may be one or more of the relief elements and the recessed elements, for example two positioned at an angle of 180° to each other, around the axis of rotation.

Thus, the second relief element or each of the second relief elements 59 of the second end portion 39 of the mechanical vibration filtering member 34 is housed inside the recessed element or one of the recessed elements 60 of the shaft 58 of the torque support 21, in the assembled configuration of the electromechanical actuator 11.

In this way, the second end portion 39 of the mechanical vibration filtering member 34 is locked with respect to rotation relative to the torque support 21, in the assembled configuration of the electromechanical actuator 11.

Advantageously, the second relief element or one of the second relief elements 59 of the second end portion 39 of the mechanical vibration filtering member 34 interacts, or in other words is configured to interact, with the recessed element or one of the recessed elements 60 of the shaft 58 of the torque support 21, in the assembled configuration of the electromechanical actuator 11, so as to lock the second end portion 39 of the mechanical vibration filtering member 34 in rotation relative to the torque support 21, while the second cavity 57 of the second end portion 39 of the mechanical vibration filtering member 34 is engaged, or in other words is configured to be engaged, with the shaft 58 of the torque support 21 by axial sliding D, along the axis of rotation X, in the assembled configuration of the electromechanical actuator 11.

Thus, the second end portion 39 of the mechanical vibration filtering member 34 is coupled to the torque support 21, in the assembled configuration of the electromechanical actuator 11. The interaction of the second relief element or elements 59 of the second end portion 39 of the mechanical vibration filtering member 34 with the recessed element or elements 60 of the shaft 58 of the torque support 21 makes it possible to engage the second cavity 57 of the second end portion 39 of the mechanical vibration filtering member 34 of the shaft 58 of the torque support 21, by axial sliding D, while ensuring locking in rotation between the second end portion 39 of the mechanical vibration filtering member 34 and the torque support 21.

Advantageously, the first cavity 61 of the first end portion 35 resembles the second cavity 57 of the second end portion 39.

Advantageously, in the assembled configuration of the electromechanical actuator 11, the first end portion 35 of the mechanical vibration filtering member 34 is fastened to the casing 17 of the electromechanical actuator 11 by means of first fastening elements 44, in particular three such elements positioned at an angle of 120° to each other, around the axis of rotation X.

Advantageously, in the assembled configuration of the electromechanical actuator 11, the second end portion 39 of the mechanical vibration filtering member 34 is fastened to the torque support 21 by means of second fastening elements 45, in particular three such elements positioned at an angle of 120° to each other, around the axis of rotation X.

Thus, the mechanical vibration filtering member 34 is assembled on the side of the first end 17*a* of the casing 17 of the electromechanical actuator 11, at which end the torque support 21 is assembled.

Here, the first and second fastening elements 44, 45 are fastening screws.

The type and the number of first and second fastening elements are not limiting. These elements may, notably, be rivets. There may be, for example, two or more of these fastening elements.

Here and as shown in FIG. 3, the mechanical vibration filtering member 34 is positioned between the torque support 21 and the electric motor 16 and, more particularly, between the torque support 21 and the battery 24.

Advantageously, each of the first and second rings 37, 40 comprises respectively a plurality of first and second fastening holes 42, 43, in particular three such holes positioned at an angle of 120° to each other, around the axis of rotation X and the longitudinal axis X34.

The number and the angular position of the first and second fastening holes are not limiting and may be different. There may be two or more first and second fastening holes, for example two holes positioned at an angle of 180° to each other, around the axis of rotation and the longitudinal axis.

Advantageously, the first fastening holes 42 are formed through the first relief elements 62 of the first end portion 35 and, more particularly, of the first ring 37. Moreover, the second fastening holes 43 are formed through the second relief elements 59 of the second end portion 39 and, more particularly, of the second ring 40.

Thus, the first and second fastening holes 42, 43 are formed respectively in the first and second ring 37, 40, in the areas of these rings having a reinforcement and/or a thickening, so as to ensure the strength of the fastening, on the one hand, between the first end portion 35 and the casing 17 and, on the other hand, between the second end portion 39 and the torque support 21.

Advantageously, the casing 17 and the torque support 21 of the electromechanical actuator 11 further comprise fastening holes 46, 47 respectively, in particular three such holes positioned at an angle of 120° to each other, around the axis of rotation X.

Thus, in the assembled configuration of the electromechanical actuator 11, the first fastening elements 44 interact, or in other words are configured to interact, with the first fastening holes 42 of the first ring 37 and the fastening holes 46 of the casing 17, which may also be called first fastening holes 46 of the casing 17. Moreover, in the assembled configuration of the electromechanical actuator 11, the second fastening elements 45 interact, or in other words are configured to interact, with the second fastening holes 43 and the fastening holes 47 of the torque support 21.

Advantageously, in the assembled configuration of the electromechanical actuator 11, the fastening of the second end portion 39 of the mechanical vibration filtering member 34 to the shaft 58 of the torque support 21 by means of the second fastening elements 45 is carried out at a predetermined distance E from the first end 17*a* of the casing 17.

Figure 8:
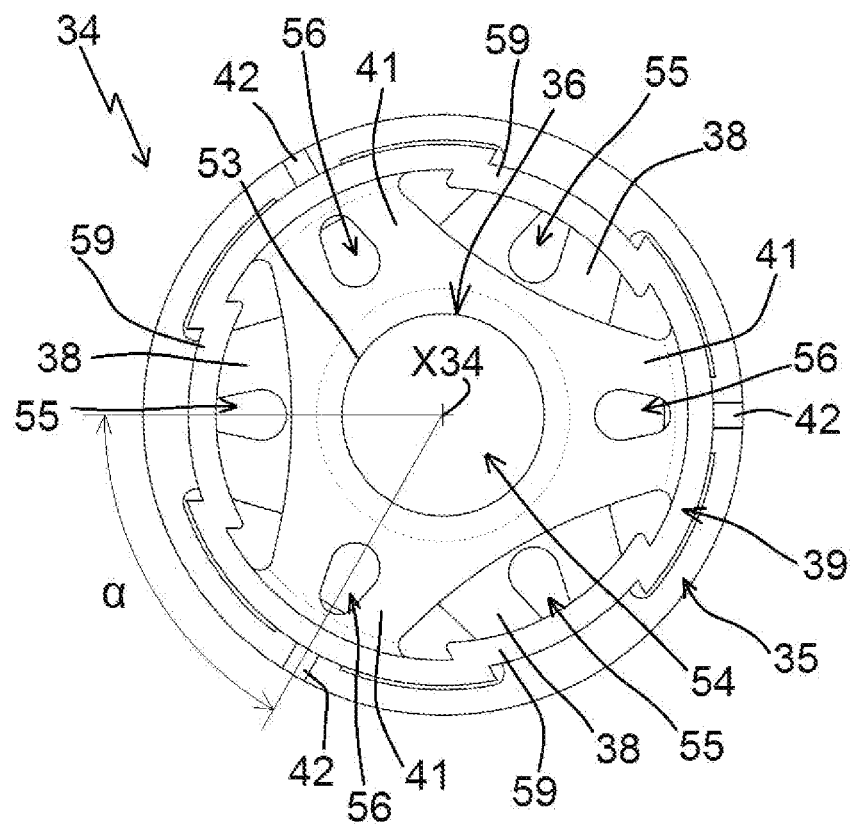
Figure 9:
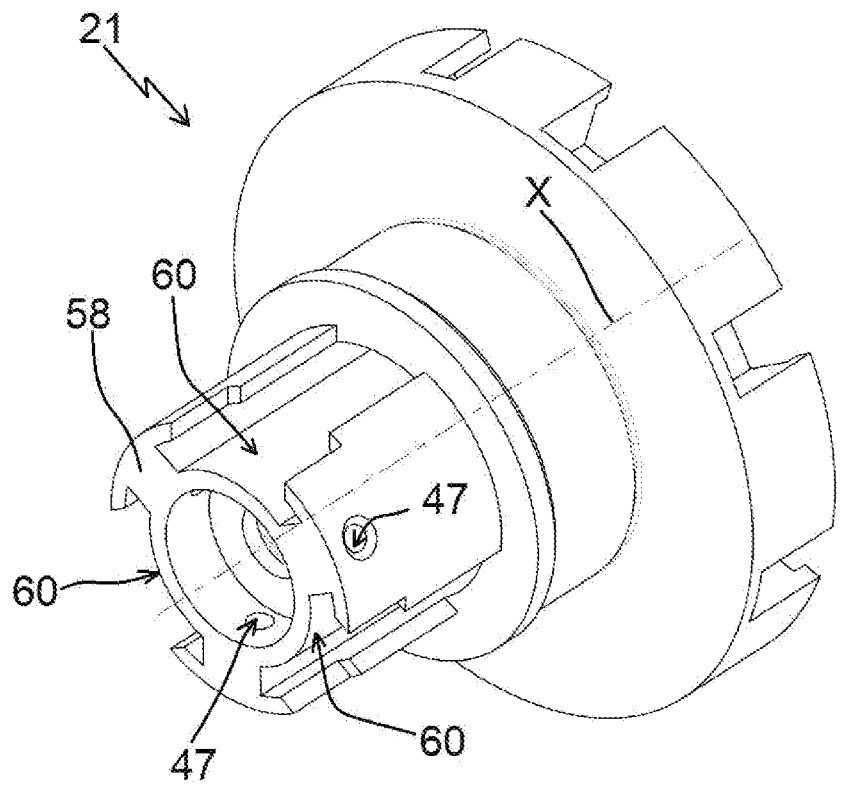

Advantageously, the first arms 38 of the first end portion 35 are offset angularly from the second arms 40 of the second end portion 39, around the longitudinal axis X34, by a predetermined angular value a, as shown in FIG. 8.

Thus, the angular offset of the first arms 38 from the second arms 40, around the longitudinal axis X34, makes it possible to provide symmetry, regardless of the angular position of the mounting of the mechanical vibration filtering member 34 with respect to the casing 17 and, in the present case, to the torque support 21.

In this way, the angular offset of the first arms 38 from the second arms 40, around the longitudinal axis X34, makes it possible to provide a symmetry of forces with respect to the casing 17 and, in the present case, to the torque support 21, when the winding tube 4 is driven in rotation by the electromechanical actuator 11.

Here, the predetermined angular value a of the angular offset, around the longitudinal axis X34, of the first arms 38 with respect to the second arms 40 is about 60°.

Advantageously, the predetermined angular value a is equal to half of the angular offset between two adjacent first arms 38 and/or between two adjacent second arms 40.

Advantageously, the first end portion 35 comprises at least a first gap 48 between the first ring 37 and one of the first arms 38 for the passage of at least a cable 18, 50, 52.

Here, the first end portion 35 comprises three first gaps 48 between the first ring 37 and the three first arms 38, for the passage of one or more cables 18, 50, 52. Each first gap 48 is an opening formed between two adjacent first arms 38 and the first ring 37.

Advantageously, the second end portion 39 comprises at least a second gap 49 between the second ring 40 and one of the second arms 41 for the passage of said at least one cable 18, 50, 52.

Here, the second end portion 39 comprises three second gaps 49 between the second ring 40 and the three second arms 41, for the passage of one or more cables 18, 50, 52. Each second gap 49 is an opening formed between two adjacent second arms 41 and the second ring 40.

Advantageously, the intermediate portion 36 is formed by means of a hollow tube 53.

Advantageously, the hollow tube 53 forming the intermediate portion 36 opens at each of its ends.

Thus, an opening 54 is formed at each of the ends of the hollow tube 53 forming the intermediate portion 36.

Advantageously, the hollow tube 53 forming the intermediate portion 36 may allow the passage of at least one cable 18, 50, 52.

In practice, the cable or cables 18, 50, 52 passing through a first gap 48 in the first end portion 35, a second gap 49 in the second end portion 39 or the hollow tube 53 forming the intermediate portion 36 may be, notably, a power supply cable 18, a data communication cable 50 or an antenna cable 52.

It may be the antenna cable 52 where the communication module 27 of the electronic control unit 15 is of the wireless type, in particular of the radio type, so that at least a part of the antenna cable 52 can be placed outside the casing 17, in the assembled configuration of the electromechanical actuator 11.

In the assembled configuration of the electromechanical actuator 11, the cable or cables 18, 50, 52 extend inside the casing 17.

Advantageously, at least one of the first arms 38 comprises at least a first cut-out 55.

Thus, the first cut-out or cut-outs 55 of the first arm or arms 38 may make it possible to reduce the stiffness of the first arm or arms 38, as well as to reduce the weight of the mechanical vibration filtering member 34.

Here, each of the first arms 38 comprises a single first cut-out 55.

The number of cut-outs in the first arm or arms is not limiting and may be different. Notably, it may be two or more.

Advantageously, at least one of the second arms 41 comprises at least a second cut-out 56.

Thus, the second cut-out or cut-outs 56 of the second arm or arms 41 may make it possible to reduce the stiffness of the second arm or arms 41, as well as to reduce the weight of the mechanical vibration filtering member 34.

Here, each of the second arms 41 comprises a single second cut-out 56.

The number of cut-outs in the second arm or arms is not limiting and may be different. Notably, it may be two or more.

Advantageously, at least one of the first cut-outs 55 or at least one of the second cut-outs 56 may allow the passage of at least one of the cables 18, 50, 52.

In a variant, not shown, each first arm 38 and each second arm 41 may have no cut-out 55, 56.

In a variant, not shown, the intermediate portion 36 and, more particularly, the hollow tube 53 forming the intermediate portion 36 comprise cut-outs.

Advantageously, the electromechanical actuator 11 comprises a bushing 63. Moreover, the bushing 63 is mounted around the shaft 58 of the torque support 21.

Thus, the bushing 63 makes it possible, or in other words is configured, to arrest an angular deformation of the mechanical vibration filtering member 34, corresponding to a creep of the latter, depending on the operating conditions of the mechanical vibration filtering member 34, such as, notably, the ambient temperature and the torque supplied by the electromechanical actuator 11 when it is put into operation.

Preferably, the bushing 63 is mounted in a freely rotatable manner around the shaft 58 of the torque support 21.

Advantageously, in the assembled configuration of the electromechanical actuator 11, the electromechanical actuator 11 further comprises at least a viscoelastic element 51 positioned between the second end portion 39 of the mechanical vibration filtering member 34, in particular the second ring 40, and the bushing 63 and/or between the casing 17 of the electromechanical actuator 11 and the bushing 63 and/or between the torque support 21 and the bushing 63.

Thus, the viscoelastic element or elements 51 positioned between the second end portion 39 of the mechanical vibration filtering member 34, in particular the second ring 40, and the bushing 63 and/or between the casing 17 of the electromechanical actuator 11 and the bushing 63 and/or between the torque support 21 and the bushing 63 make it possible to prevent the casing 17 from rattling against the torque support 21, in the assembled configuration of the electromechanical actuator 11 and when the latter is put into operation.

Advantageously, the viscoelastic element or elements 51 are positioned on an inner surface 63a of the bushing 63 and/or on an outer surface 63b of the bushing 63 and/or on at least one of the lateral surfaces 63c of the bushing 63.

Thus, in such a case, the bushing 63 forms a rigid frame 63d and the viscoelastic element or elements 51 form a flexible part 63e, this flexible part 63e being applied to the rigid frame 63d.

In this way, the flexible part 63e can be assembled on the inside and/or around the rigid frame 63d.

Figure 5:
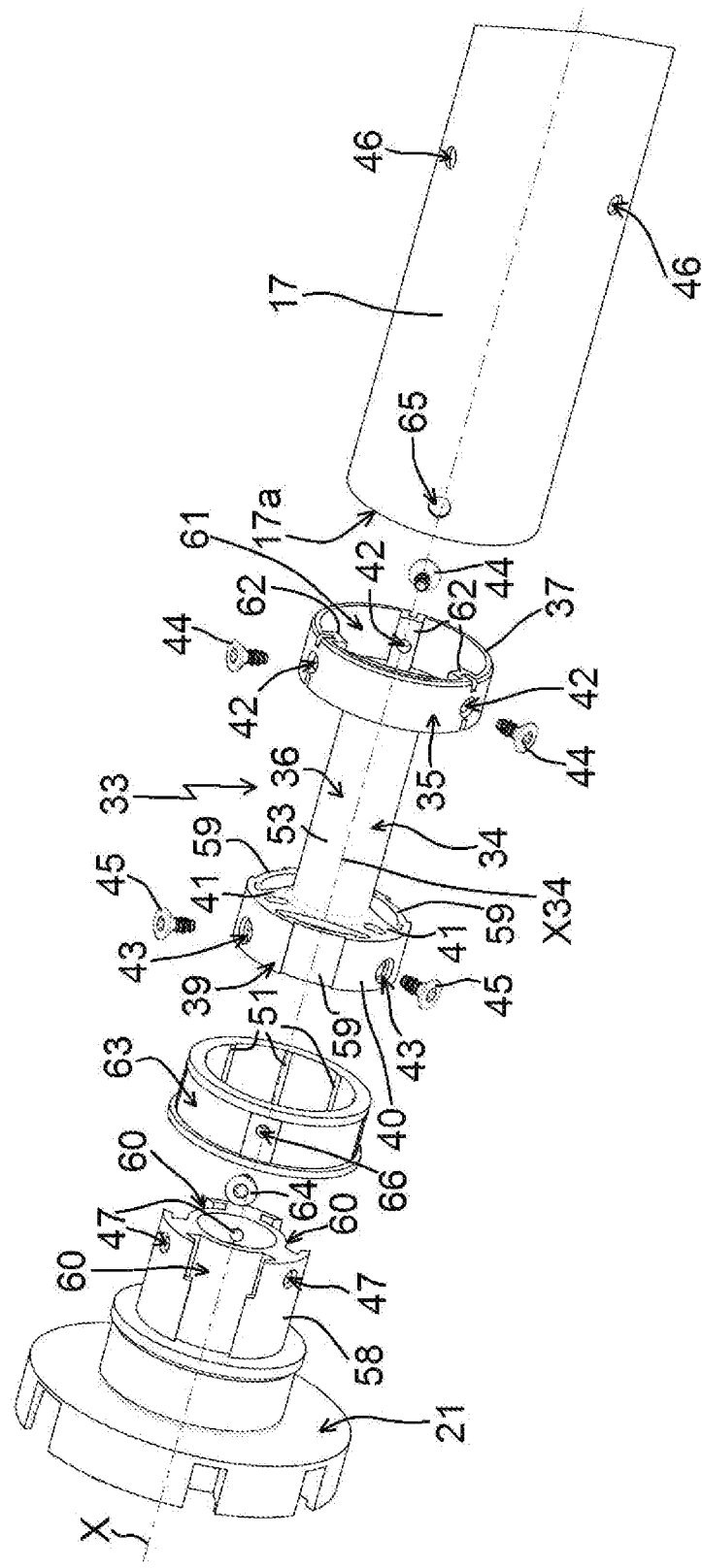
Figure 6:
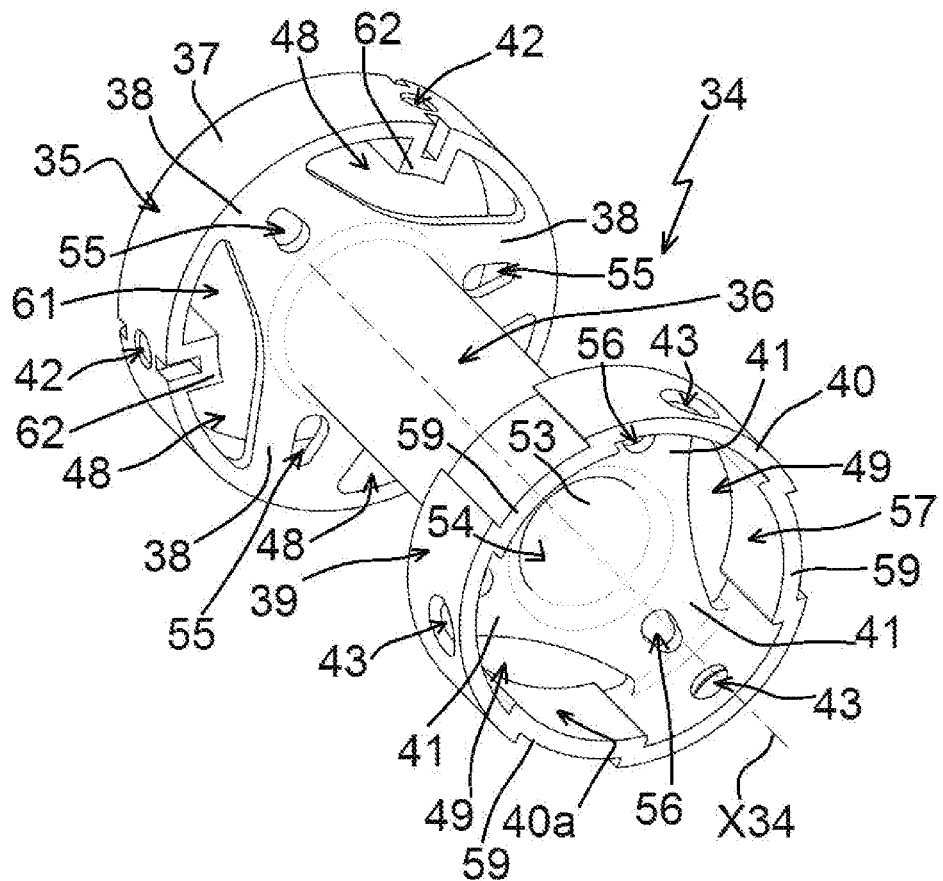
Figure 7:
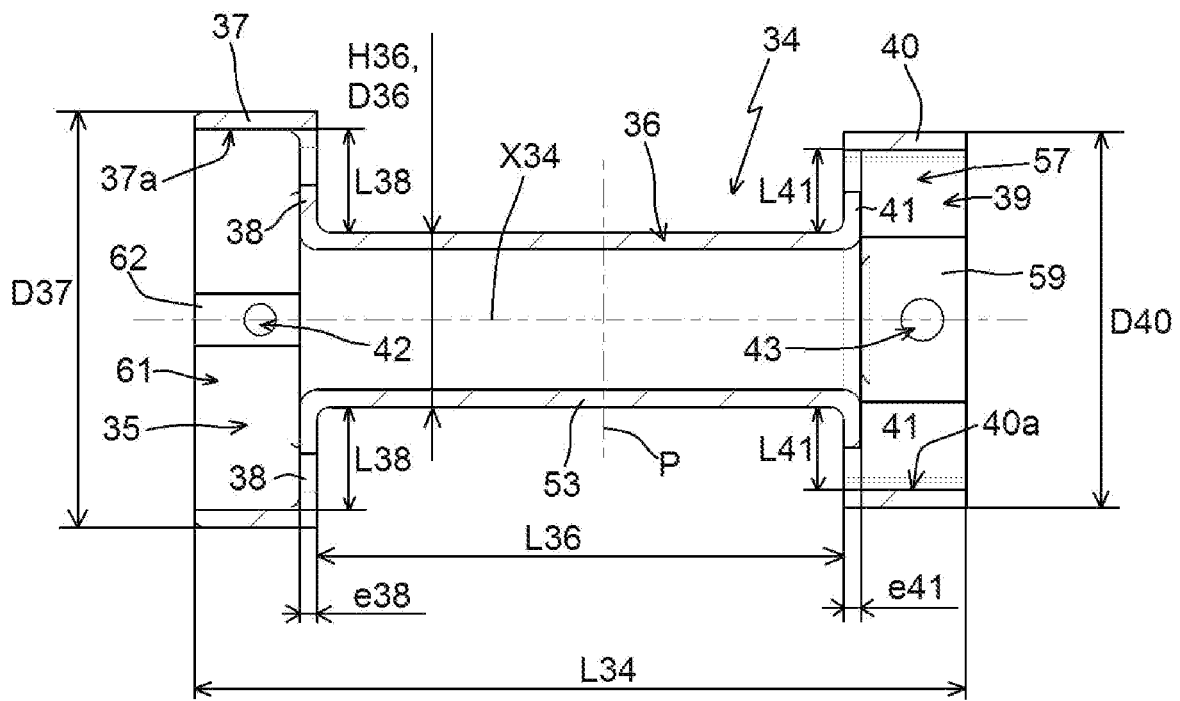
Figure 10:
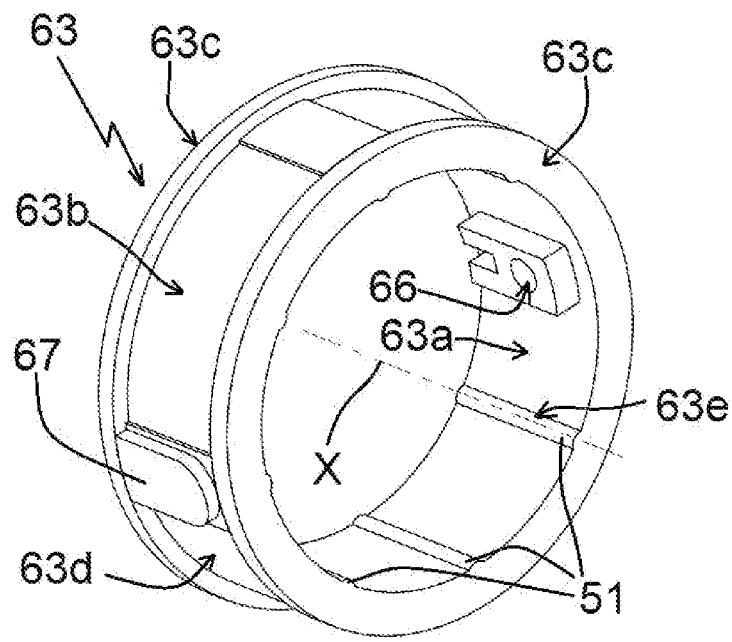

Here and as shown in FIGS. 5 and 10, the viscoelastic element or elements 51 form an integral part of the bushing 63 and are overmolded on the bushing 63.

In a variant, the viscoelastic element or elements 51 are assembled onto the inner surface 63a and/or onto the outer surface 63b and/or onto at least one of the lateral surfaces 63c of the bushing 63, by gluing for example.

Advantageously, the viscoelastic element or elements 51 may be elastomeric blocks, also called ribs, as shown in FIGS. 5 and 10.

Here, the electromechanical actuator 11 comprises seven viscoelastic elements 51 distributed around the axis of rotation X.

The number of viscoelastic elements is not limiting and may be different.

In a variant, not shown, the viscoelastic element 51 may form the bushing 63. In such a case, the bushing 63 forms the flexible part and has no rigid frame.

Advantageously, in the assembled configuration of the electromechanical actuator 11, the casing 17 is fastened to the bushing 63 by means of at least a fastening element 64, in particular a single fastening element 64, as shown in FIG. 5.

Thus, the bushing 63 is locked with respect to translation inside the casing 17 of the electromechanical actuator 11 and, more particularly, with respect to the casing 17.

In this way, the bushing 63 has limited axial play J between the torque support 21, in particular the shaft 58 of the torque support 21, and the mechanical vibration filtering member 34, in the direction of the axis of rotation X.

Consequently, such an assembly of the bushing 63 inside the casing 17 of the electromechanical actuator 11 enables the axial deformation of the mechanical vibration filtering member 34 to be limited.

Here, the fastening element 64 is a fastening screw.

The type and the number of fastening elements are not limiting. These elements may, notably, be rivets and there may be, for example, two or more of them, in particular three elements positioned at an angle of 120° to each other, around the axis of rotation.

Advantageously, the casing 17 comprises at least a fastening hole 65, in particular a single fastening hole 65, as shown in FIG. 5, which may also be called second fastening hole 65 of the casing 17.

Advantageously, the bushing 63 comprises at least a fastening hole 66, in particular a single fastening hole 66, as shown in FIGS. 5 and 10.

The number and the angular position of the fastening holes of the casing and of the ring are not limiting and may be different. There may be two or more of the fastening holes and, in particular, there may be three holes positioned at an angle of 120° to each other, around the axis of rotation.

Advantageously, in the assembled configuration of the electromechanical actuator 11, the fastening element 64 interacts, or in other words is configured to interact, with the fastening hole 65 of the casing 17, with the fastening hole 66 of the bushing 63 and, eventually, with one of the viscoelastic elements 51.

Advantageously, the bushing 63 comprises at least an indexing element 67, in particular a single indexing element 67, as shown in FIG. 10. The indexing element 67 of the bushing 63 interacts, or in other words is configured to interact, with an inner surface 17c of the casing 17 of the electromechanical actuator 11 and, more particularly, with a notch, not shown, formed in the casing 17, in the assembled configuration of the electromechanical actuator 11.

Thus, the bushing 63 is oriented with respect to the casing 17 of the electromechanical actuator 11, around the axis of rotation X, in the assembled configuration of the electromechanical actuator 11.

Here, the indexing element 67 of the bushing 63 is a block or a rib.

The number and the angular position of the indexing elements of the ring are not limiting and may be different. There may be two or more of the indexing elements and, in particular, there may be three elements positioned at an angle of 120° to each other, around the axis of rotation.

Advantageously, the first arms 38 and, eventually, the second arms 41 extend in a direction parallel to or coinciding with the plane P orthogonal to the longitudinal axis X34.

Figure 11:
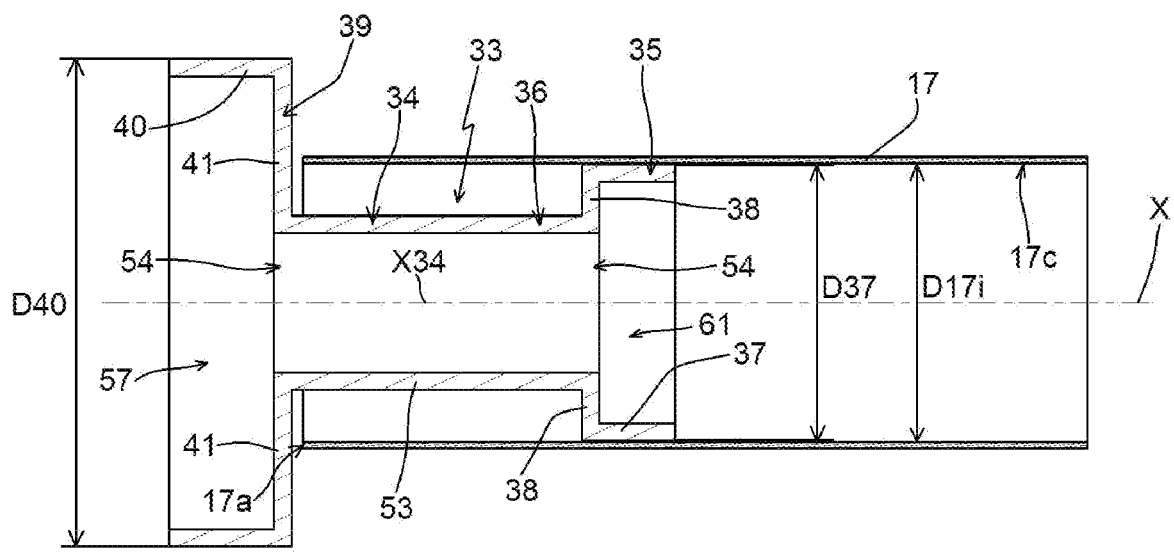
FIG. 11 is a view similar to FIG. 4 showing a mechanical module for filtering vibrations according to a second embodiment of the invention.
Figure 12:
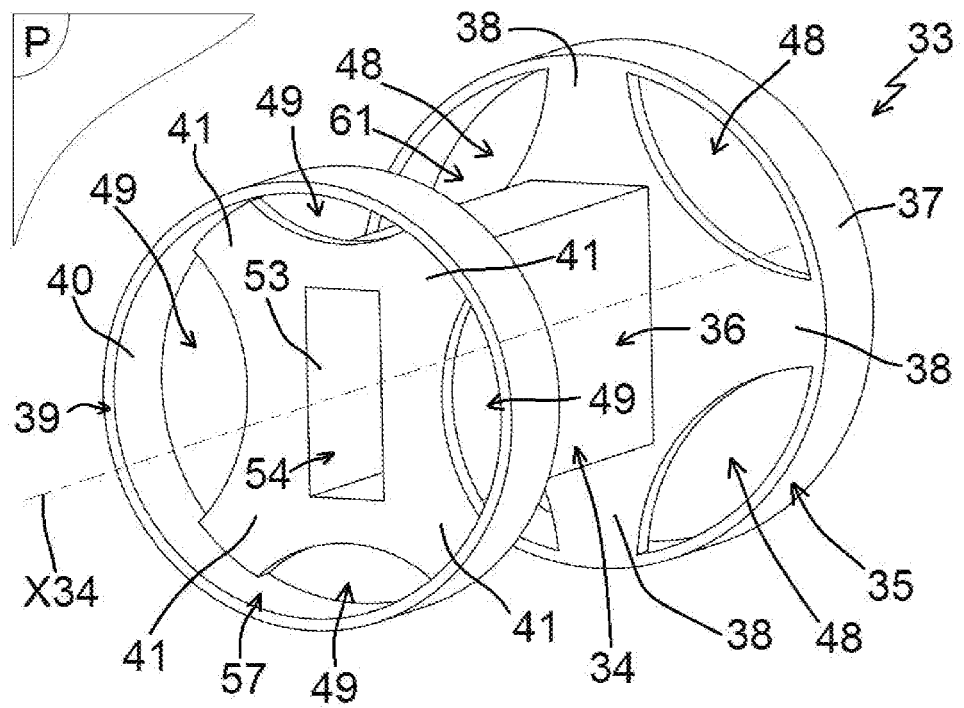
FIG. 12 is a view similar to FIG. 6 showing a mechanical vibration filtering member of a mechanical module for filtering vibrations according to a third embodiment of the invention.
Figure 13:
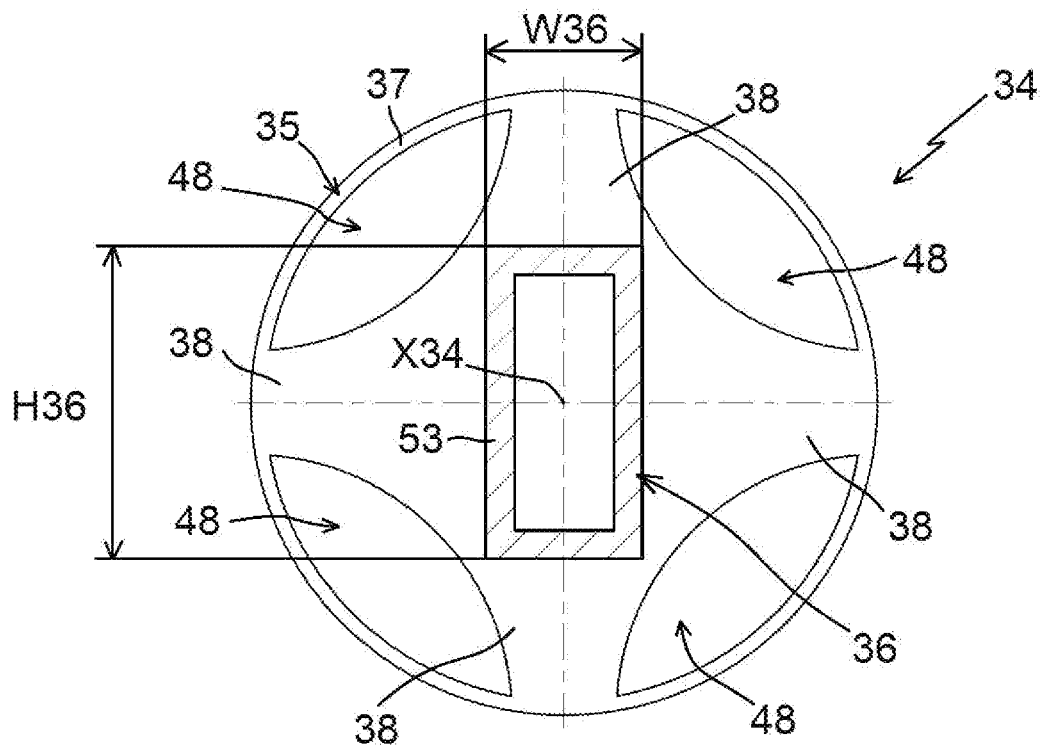
FIG. 13 is a schematic sectional view of the mechanical vibration filtering member shown in FIG. 12.

In a second and a third embodiments, shown in FIGS. 11 to 13, the elements similar to those of the first embodiment bear the same references and operate as explained above. The following text mainly describes what distinguishes these second and third embodiments from the preceding one. In the following text, when a reference mark is used without being reproduced in one of FIGS. 11 to 13, it corresponds to the object bearing the same reference in one of FIGS. 1 to 10.

The mechanical module for filtering vibrations 33 of the electromechanical actuator 11, shown in FIG. 3, according to the second embodiment of the invention, is now described with reference to FIG. 11.

Here, the second end portion 39 of the mechanical vibration filtering member 34 forms the torque support 21.

Thus, in the case where the second end portion 39 of the mechanical vibration filtering member 34 forms the torque support 21, the length L11 of the electromechanical actuator 11 may be reduced, because the torque support 21 is integrated into the mechanical vibration filtering member 34.

Advantageously, the first diameter D37 of the first ring 37 is smaller than or equal to the second diameter D40 of the second ring 40.

Preferably, in the case where the second end portion 39 of the mechanical vibration filtering member 34 forms the torque support 21, the diameter D40 of the second ring 40 of the second end portion 39 is greater than or equal to the inside diameter D17i of the casing 17.

Here, a first part of the mechanical module for filtering vibrations 33, in particular of the mechanical vibration filtering member 34, formed by the intermediate portion 36 and the first end portion 35, is mounted inside the casing 17 of the electromechanical actuator 11. Moreover, a second part of the mechanical module for filtering vibrations 33, in particular of the mechanical vibration filtering member 34, formed by the second end portion 39, is mounted outside the casing 17 of the electromechanical actuator 11.

The mechanical module for filtering vibrations 33 of the electromechanical actuator 11, shown in FIG. 3, according to the third embodiment of the invention, is now described with reference to FIGS. 12 and 13.

Here, the intermediate portion 36 has a cross section of rectangular shape, in the plane P orthogonal to the longitudinal axis X34.

Thus, the rectangular cross section of the intermediate portion 36, in the plane P orthogonal to the longitudinal axis X34, is particularly suitable in the case where the electromechanical actuator 11 can only be installed in a single position in the installation 6 and, in particular, with respect to the holding device 9, 23.

In this way, the height H36 of the intermediate portion 36 is less than a width W36 of this portion, in the plane P orthogonal to the longitudinal axis X34.

Advantageously, the width W36 of the intermediate portion 36 is orthogonal to the wall M of the building B, shown in FIG. 1. The wall M of the building B is parallel to the direction of the winding and unwinding of the screen 2 around the winding tube 4, in the assembled configuration of the electromechanical actuator 11 in the installation 6. Moreover, the height H36 of the intermediate portion 36 is parallel to this wall M of the building B or to the direction of the gravitational field.

Thus, in such a case, the mechanical vibration filtering member 34 may have low bending stiffness in a preponderant direction of vibrations transmission, in particular orthogonal to the wall M, while maintaining high bending stiffness in the direction of gravity, as well as high torsional stiffness.

Here, the first end portion 35 comprises four first arms 38. Moreover, the second end portion 39 comprises four second arms 41.

Furthermore, the predetermined angular value a of the angular offset, around the longitudinal axis X34, of the first arms 38 with respect to the second arms 40 is about 45°.

Here, the first end portion 35 comprises four first gaps 48 between the first ring 37 and the four first arms 38, for the passage of one or more cables 18, 50, 52. Each first gap 48 is an opening formed between two adjacent first arms 38 and the first ring 37.

Moreover, the second end portion 39 comprises four second gaps 49 between the second ring 40 and the four second arms 41, for the passage of one or more cables 18, 50, 52. Each second gap 49 is an opening formed between two adjacent second arms 41 and the second ring 40.

A description is now given, with reference to FIGS. 1 to 13, of aspects of the mechanical module for filtering vibrations 33 of the electromechanical actuator 11, shown in FIG. 3, applicable to the first, second and third embodiments of the invention, defined above.

The dimensions of the mechanical vibration filtering member 34 are determined on the basis of the required qualities, in particular in terms of mechanical strength, deformation and stiffness. The dimensions of the mechanical vibration filtering member 34 are also determined on the basis of the choice of the material of this member.

The dimensions of the mechanical vibration filtering member 34 to be determined, on the basis of the aforementioned parameters, are, notably, the height H36 and the width W36, in the plane P orthogonal to the longitudinal axis X34, or the diameter D36 of the intermediate portion 36, the length L36 of the intermediate portion 36, the length L38, L41 of the first arms 38 and, eventually, of the second arms 41 between the intermediate portion 36 and the first ring 37 or the second ring 40, respectively, the thickness e38, e41 of the first arms 38 and, eventually, of the second arms 41, as well as, eventually, the cut-outs 55, 56 formed in the first and second arms 38, 41 and in the intermediate portion 36.

In order to reduce the bending stiffness of the mechanical vibration filtering member 34, the modification of the dimensions of the latter consists in executing at least one of the following possible operations: elongating the length L36 of the intermediate portion 36, elongating the length L38, L41 of the first arms 38, and, eventually, of the second arms 41, or in other words reducing the height H36, in the plane P orthogonal to the longitudinal axis X34, or the diameter D36 of the intermediate portion 36, or decreasing the thickness e38, e41 of the first arms 38 and, eventually, of the second arms 41.

In order to increase the mechanical strength and reduce the deformations of the mechanical vibration filtering member 34, the modification of the dimensions of the latter consists in executing at least one of the following possible operations: reducing the length L36 of the intermediate portion 36, reducing the length L38, L41 of the first arms 38 and, eventually, of the second arms 41, or in other words increasing the height H36, in the plane P orthogonal to the longitudinal axis X34, or the diameter D36 of the intermediate portion 36, or increasing the thickness e38, e41 of the first arms 38 and, eventually, of the second arms 41.

Another parameter to be taken into account for the determination of the dimensions of the mechanical vibration filtering member 34 is a weight of an assembly to be suspended by means of the mechanical module for filtering vibrations 33.

On the basis of the weight of the assembly to be suspended by means of the mechanical module for filtering vibrations 33, the determination of the dimensions of the mechanical vibration filtering member 34 is to be carried out to ensure a shear strength of the latter.

In the first embodiment, the assembly to be suspended by means of the mechanical module for filtering vibrations 33 is the electromechanical actuator 11, into which the battery 24 may be integrated.

In the second embodiment, the assembly to be suspended by means of the mechanical module for filtering vibrations 33 is the covering device 3, that is to say the winding tube 4, the screen 2 and the electromechanical actuator 11, into which the battery 24 may be integrated.

In such a case, the mechanical vibration filtering member 34 has a high stiffness, as well as in bending and in torsion, and is compact.

The structure of the mechanical vibration filtering member 34 according to the third embodiment is particularly useful in the case where the assembly to be suspended by means of the mechanical module for filtering vibrations 33 is the covering device 3.

Thanks of the present invention, such a structure of the mechanical vibration filtering member is simplified and makes it possible to ensure a reduction in vibrations transmission from the electromechanical actuator to the installation, while minimizing the costs of producing the mechanical module for filtering vibrations and thus of the electromechanical actuator.

In this way, the industrial production of such a mechanical module for filtering vibrations is facilitated.

The structure of the mechanical vibration filtering member makes it possible to produce a deformation of the intermediate portion and to produce a swivel at the joint between the intermediate portion and the first end portion.

The structure of the mechanical vibration filtering member also makes it possible to minimize the length of the latter and thus to produce a compact mechanical module for filtering vibrations, so as to minimize the length of the electromechanical actuator.

Moreover, the first arms of the first end portion make it possible to provide a high torsional stiffness and a low bending stiffness of the mechanical vibration filtering member.

Furthermore, such a mechanical module for filtering vibrations is also particularly suitable for electromechanical actuators comprising a casing having a small diameter.

Evidently, numerous modifications may be made to the examples of embodiment described above without departure from the scope of the invention defined by the claims.

In a variant, not shown, the first arms 38 and, eventually, the second arms 41 may extend in an inclined direction with respect to the longitudinal axis X34. This inclined direction with respect to the longitudinal axis X34 forms an angle, on the one hand, which is strictly greater than 0° or strictly less than 180° and, on the other hand, strictly less than or strictly greater than 90°.

In a variant, not shown, the second end portion 39 may have no arm 41. In such a case, the intermediate portion 36 is connected to the second ring 40 of the second end portion 39 by means of a solid partition.

Advantageously, the solid partition connecting the intermediate portion 36 to the second ring 40 of the second end portion 39 may extend in a direction parallel to or coinciding with the plane P orthogonal to the longitudinal axis X34 or in an inclined direction with respect to the longitudinal axis X34. This inclined direction with respect to the longitudinal axis X34 forms an angle, on the one hand, which is strictly greater than 0° or strictly less than 180° and, on the other hand, strictly less than or strictly greater than 90°.

In a variant, not shown, the mechanical module for filtering vibrations 33 comprises a first mechanical vibration filtering member 34, as described above, with reference to the first and third embodiments, and fastened, on the one hand, to the casing 17 and, on the other hand, to the torque support 21, as mentioned above in the first embodiment, as well as a second mechanical vibration filtering member 34, as described above, with reference to the first and third embodiments, and assembled at the output shaft 20 of the electromechanical actuator 11 and, more particularly, between two parts of the output shaft 20.

In a variant, not shown, the electromechanical actuator 11 has no bushing 63, in particular if the mechanical vibration filtering member 34 is not subject to a creep as a result of its dimensions, if a creep of the mechanical vibration filtering member 34 is acceptable or if a creep of the mechanical vibration filtering member 34 can be compensated by means of the electronic control unit 15, as well as in cases where the limit and/or obstacle detection is implemented mechanically or electronically.

In a variant, not shown, the electromechanical actuator 11 does not have the viscoelastic element or elements 51, in particular if sufficient play is provided between the casing 17 and the torque support 21, so as to prevent the casing 17 from rattling against the torque support 21, in the assembled configuration of the electromechanical actuator 11 and when the latter is put into operation.

In a variant, not shown, the electromechanical actuator 11 is inserted into a rail, in particular a rail of square or rectangular cross section, that may be open at one or both of its ends, in the assembled configuration of the covering device 3. Furthermore, the electromechanical actuator 11 may be configured to drive a drive shaft on which cords for the movement and/or orientation of the screen 2 are wound.

The embodiments and variants considered here may also be combined to create new embodiments of the invention, without departing from the scope of the invention as defined by the claims.

The invention claimed is:

1. A mechanical module for filtering vibrations intended to be mounted at least partially inside a casing of an electromechanical actuator for a closure, covering or solar protection installation,
the mechanical module for filtering vibrations comprising at least a mechanical vibration filtering member, the mechanical vibration filtering member being made in one piece and extending along a longitudinal axis intended to be aligned with an axis of rotation of a rotor of an electric motor,
the mechanical vibration filtering member comprising at least:
a first end portion, the first end portion comprising at least a first ring, and
an intermediate portion, the intermediate portion being connected to the first end portion, the first ring of the first end portion (having a first diameter greater than a greatest dimension of the intermediate portion measured in a plane orthogonal to the longitudinal axis,
wherein the first end portion further comprises a plurality of first arms, each of the first arms connecting the intermediate portion to the first ring.

2. The mechanical module for filtering vibrations according to claim 1, wherein the intermediate portion has a cross section of circular shape, in the plane orthogonal to the longitudinal axis, or wherein the intermediate portion has a cross section of rectangular shape, in the plane orthogonal to the longitudinal axis.

3. The mechanical module for filtering vibrations according to claim 1, wherein:
the mechanical vibration filtering member further comprises at least a second end portion, the second end portion being opposed to the first end portion along the longitudinal axis, the second end portion comprising at least a second ring,
the intermediate portion is connected to the second end portion and is positioned between the first and second end portions, and
the second ring of the second end portion has a second diameter greater than the greatest dimension of the intermediate portion measured in the plane orthogonal to the longitudinal axis.

4. The mechanical module for filtering vibrations according to claim 3, wherein the second diameter of the second ring is more than the first diameter of the first ring.

5. The mechanical module for filtering vibrations according to claim 3, wherein the second diameter of the second ring is less than the first diameter of the first ring.

6. The mechanical module for filtering vibrations according to claim 3, wherein the second end portion further comprises a plurality of second arms, each of the second arms connecting the intermediate portion to the second ring.

7. The mechanical module for filtering vibrations according to claim 6, wherein the first arms are angularly offset from the second arms, around the longitudinal axis, by a predetermined angular value.

8. An electromechanical actuator for a closure, covering or solar protection installation, the electromechanical actuator comprising:
an electric motor,
a casing, the electric motor being mounted inside the casing, in an assembled configuration of the electromechanical actuator, and
at least a mechanical module for filtering vibrations according to claim 1.

9. The electromechanical actuator according to claim 8, wherein, in the assembled configuration of the electromechanical actuator, the first end portion of the mechanical vibration filtering member is fastened to the casing by means of first fastening elements.

10. The electromechanical actuator according to claim 8, wherein:
the mechanical vibration filtering member further comprises at least a second end portion, the second end portion being opposed to the first end portion along the longitudinal axis, the second end portion comprising at least second ring, the intermediate portion is connected to the second end portion and is positioned between the first and second end portions, and the second ring of the second end portion has a second diameter greater than the greatest dimension of the intermediate portion measured in the plane orthogonal to the longitudinal axis, wherein the electromechanical actuator further comprises a torque support, the torque support being positioned at a first end of the casing of the electromechanical actuator, in the assembled configuration of the electromechanical actuator, and wherein the second end portion of the mechanical vibration filtering member is fastened to the torque support by means of second fastening elements.

11. The electromechanical actuator according to claim 10, wherein the second diameter of the second ring is less than the first diameter of the first ring.

12. The electromechanical actuator according to claim 10, wherein the second diameter of the second ring is more than the first diameter of the first ring.

13. The electromechanical actuator according to claim 10, wherein the electromechanical actuator comprises a bushing and wherein the bushing is mounted around a shaft of the torque support.

14. The electromechanical actuator according to claim 13, wherein, in the assembled configuration of the electromechanical actuator, the electromechanical actuator further comprises at least a viscoelastic element positioned in a position which is at least one selected from the group consisting of:

between the second end portion of the mechanical vibration filtering member and the bushing, between the casing of the electromechanical actuator and the bushing, between the torque support and the bushing.

15. The electromechanical actuator according to claim 8, wherein the mechanical vibration filtering member further comprises at least a second end portion, the second end portion being opposed to the first end portion along the longitudinal axis, the second end portion comprising at least a second ring, the intermediate portion is connected to the second end portion and is positioned between the first and second end portions, and second ring of the second end portion has a second diameter greater than the greatest dimension of the intermediate portion measured in the plane orthogonal to the longitudinal axis, wherein the electromechanical actuator further comprises a torque support, the torque support being positioned at a first end of the casing of the electromechanical actuator, in the assembled configuration of the electromechanical actuator, and wherein the second end portion of the mechanical vibration filtering member forms the torque support.

16. The electromechanical actuator according to claim 15, wherein the second diameter of the second ring is less than the first diameter of the first ring.

17. The electromechanical actuator according to claim 15, wherein the second diameter of the second ring is more than the first diameter of the first ring.

18. The electromechanical actuator according to claim 8, wherein the electromechanical actuator comprises at least a battery, the battery being positioned inside the casing.

19. The electromechanical actuator according to claim 8, wherein the first end portion comprises at least a first gap between the first ring and one of the first arms for the passage of at least one cable.

20. A closure, covering or solar protection installation, comprising:

a screen, a winding tube, and an electromechanical actuator according to claim 8, wherein the screen is windable onto the winding tube and the winding tube is driven in rotation by the electromechanical actuator.

* * * * *